United States Patent [19]
Fongen

[11] Patent Number: 5,876,594
[45] Date of Patent: Mar. 2, 1999

[54] TURBO OXIDATION SYSTEM,—TOS, FOR WET COMBUSTION OF COD-CONTAINING LIQUIDS AND FOR COD-REDUCTION BY ENZYMES

[76] Inventor: Sigurd Fongen, vei 24, Eivind Alna, Kolbotn, Norway, N-1410

[21] Appl. No.: 313,182

[22] PCT Filed: Apr. 10, 1992

[86] PCT No.: PCT/NO92/00067

§ 371 Date: Oct. 7, 1994

§ 102(e) Date: Oct. 7, 1994

[51] Int. Cl.[6] ...................................................... C02F 1/72
[52] U.S. Cl. .......................... 210/104; 210/177; 210/180; 210/194; 210/218; 210/761
[58] Field of Search ..................... 210/104, 110, 210/134, 177, 180, 194, 205, 218, 220, 761

[56] References Cited

U.S. PATENT DOCUMENTS

| | | |
|---|---|---|
| 3,852,192 | 12/1974 | Fassell et al. . |
| 3,870,631 | 3/1975 | Fassell et al. . |
| 4,869,833 | 9/1989 | Binning et al. ............................. 10/177 |
| 4,986,903 | 1/1991 | Canzonori et al. ...................... 210/194 |
| 5,156,745 | 10/1992 | Cairo, Jr. et al. ........................ 210/194 |
| 5,205,935 | 4/1993 | Ruocco ................................... 210/194 |

FOREIGN PATENT DOCUMENTS

| | | |
|---|---|---|
| 0157659 | 10/1985 | European Pat. Off. . |
| 23 58 918 | 5/1975 | Germany . |
| 2167399 | 5/1986 | United Kingdom . |

OTHER PUBLICATIONS

International Search Report for PCT/NO92/00067.
International Preliminary Examination Report for Application No. PCT/NO92/00067.

*Primary Examiner*—Christopher Upton
*Attorney, Agent, or Firm*—Kane,Dalsimer,Sullivan,Kurucz et al

[57] ABSTRACT

The patent claims concern a method for a more efficient "wet [combustion] oxidation" of COD-containing effluents from industrial processes and municipal plants and for a more efficient COD-reduction by enzymes in aerobic and anaerobic biological cleaning processes and for same sorts of effluents. The method implies a strong increase of the reaction speed between added oxygen and the elements in the liquid to be oxidized through so-called "Turbo Oxidation", which implies that the liquid is submitted to strong movements nd turbulence during several circulations within one or more liquid circuits during continuous addition of oxygen. By the same method, COD reduction by enzymes can also be made more effective. The single circuit is placed in connection to and communicates liquid-wise with a pressurized reaction tank, from where the developed reaction gases are continuously let out. Into the circuits and the attached reaction tank is continuously fed controlled quantities of the liquid to be oxidized together with proportionate quantities of oxygen or enzymes. Concurrently, the outlets of respectively oxidized liquid and evolved gases are controlled automatically. Out-going, oxidized liquid can be heat exchanged against in-going liquid, and the hot gases from the reaction tank can be used for external, heating purposes.

5 Claims, 2 Drawing Sheets

TURBO OXIDATION SYSTEM,— TOS, FOR WET COMBUSTION OF COD-CONTAINING LIQUIDS AND FOR COD-REDUCTION BY ENZYMES

REFERENCES TO RELATED PUBLICATIONS

This invention is especially suitable in combination with 2 previous patent applications from the same inventor, namely Norwegian patent Application No. 884546, with title: "Method for production of pulp from plant and/or wood fibres and/or delignification of secondary fibres", and Norwegian Patent Application No. 882815, titled: "Method for production of pulp and delignification, bleaching, de-inking and washing of cellulose fibres and apparatus for carrying out the method".

Both patent applications deal partly with oxidation of lignin containing cellulosic materials in fibre suspensions.

BACKGROUND OF THE INVENTION

1. Field of Invention

The invention concerns an apparatus for improved wet oxidation of COD-containing effluents from industry and other activities containing chemical compounds which can be oxidized, especially oxidation of dissolved hydrocarbons, and is based on production experiences from the two above-mentioned inventions.

The apparatus is however also applicable for wet oxidation of other, COD-containing liquids in other connections, hereunder also biological, aerobic COD-reduction with activated sludge.

The apparatus is also applicable for anaerobic, biological COD-reduction with activated sludge, but then with shut off supply of oxygen and/or air.

2. Description of the Prior Art

Wet oxidation of oxidable compounds in aqueous solutions is well known as chemical reaction.

By 1960, descriptions of fullscale, technical plants for process industry and municipal installations were published. During the last 20–30 years more plants have been built, especially in USA and Europe.

The experience however from these plants is that they are expensive both in buying and operation. The wet oxidation process has therefore not found a widespread application appropriate to the demand, especially after the escalated environmental demands of the last few years.

This fact is based on the following 4 conditions:

1. The effluents to be oxidized are frequently very diluted, having a low COD-content, substantially below 20 g COD/1.

A very diluted effluent requires large heat quantities for heating to the required reaction temperature, in most cases exceeding 150° C. A prerequisite for an economical wet oxidation is that the liquid preferably contains from 20 to 50 g COD/1 liquid.

2. Wet oxidation of industrial and municipal effluents requires frequently large quantities of oxygen, a fact which implies relatively high operational costs, regardless if the oxygen is added in a pure form or in a form of compressed air.

In order to become economically acceptable, the process must be able to maintain itself by its own heat generation, and preferably be able to deliver excess heat for other applications.

3. When using compressed air, the oxygen constitutes only ca 20% of the added air.

Today's wet oxidation plants operate with long reaction times, usually between 30 and 60 minutes. Such long retention time for a liquid-air-mixture in the system requires large volume within a big and closed reaction system.

Such a system becomes especially expensive due to the high pressures applied in order to "get into place" all the oxygen or the air, which quantity-wise must be adjusted to the COD-content to be oxidized.

The traditional plants of today frequently apply pressures in the order of 200 and 300 bars, a fact which besides making the plants expensive due to the pressure dimensioning also implies operational problems of technical and mechanical kind.

4. Today's plants for so-called biological COD-reduction with aerobic or anaerobic enzymatic processes operate very slowly with long reaction times which require voluminous and expensive plants.

SUMMARY OF THE INVENTION

The invention aims at a strong escalation of the reaction speed compared to the described prior art in order to achieve shortening of the required liquid retention time within the system.

The described apparatus also reduces the necessity for the high reaction pressures applied by wet oxidation today. Thus the plant require a more moderate pressure dimensioning.

Both these facts reduce the plant's size and capital requirement accordingly.

The aim of the invention is obtained by a strong increase in the accessibility between the different chemical compounds which are going to react with each other, hereunder lignin, sugar rests and other compounds in woods, oxygen and enzymes. By putting the liquid into strong, internal, turbulent movements within a circulating liquid circuit, with a concurrent and continuous addition of oxygen in pure form or as compressed air in the same circuit, and/or enzymes in biological processes.

The fast reaction speeds thus achieved implies that the reaction gases evolved together with the possibility that air or nitrogen excesses can be continuously let out of the system.

In this manner, wet oxidation can be carried out at a lower system pressure, a fact which makes possible a corresponding reduced pressure dimensioning of the plant.

The hot excess gases from a wet combustion plant as described may be used for other production of energy, such as in a boiler house.

DESCRIPTION OF THE PREFERRED EMBODIMENT

Figure 1:
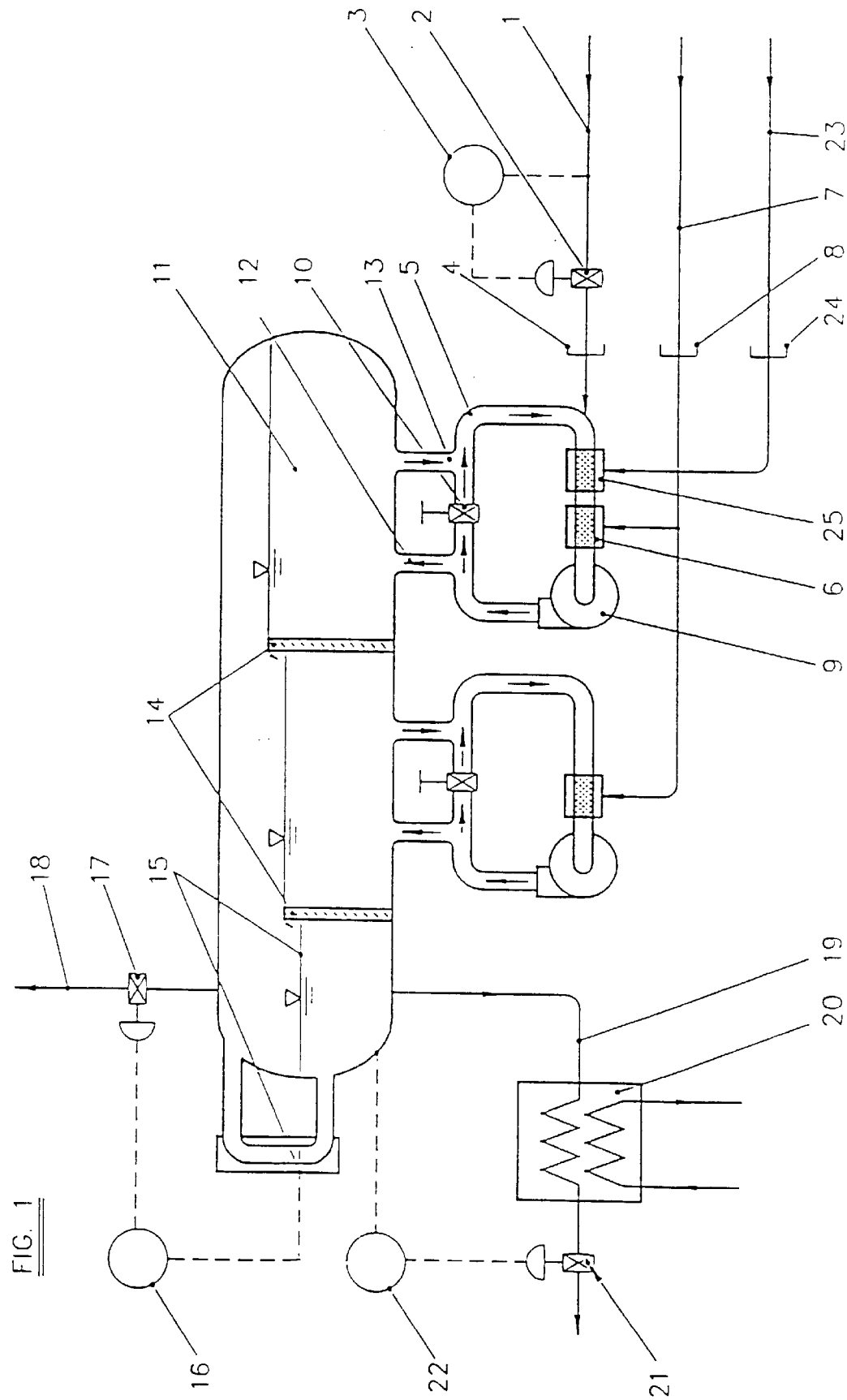
FIG. 1 depicts the pressurized reaction system for liquid-gas mixture by wet oxidation of the present invention.

The liquid to be oxidized is conducted into the pressurized system through inlet pipe 1 and valve 2 which is controlled by quantity controller 3.

The liquid is pressed into the system by a pumping pressure which is higher than the pressure in the reaction system, brought about by a pump not shown in the drawing.

The liquid passes a check valve 4 before it streams into a circuit 5. In the circuit the liquid streams through a "sparger" 6 of known construction, through which the circuit is continuously fed with finely distributed oxygen from the supply pipe 7 and check valve 8.

The circuit is driven by a pump of special design 9, and by the valve 10 is regulated the average number of circulations in the circuit before the liquid streams into the reaction tank 11 through a pipe 12 which creates a liquid-wise communication between circulating loop 5 and the reaction tank 11.

Another pipe, 13, opens inlet to the circuit from the reaction tank. The special pump 9 brings about a circulating pumping within circuit 5 and is equipped with a pumping impeller which preferably is of a special design which creates a strongest possible liquid turbulence and inner mixing of the liquid and the oxygen which is being injected into the circuit.

The liquid level in the reaction tank 15 is kept constant by a level controlled regulator 16 which controls the outlet valve 17 for the gases which opens up for a continuous outlet of gases from the reaction tank through the outlet pipe 18.

Liquid outlet from the reaction tank is carried out through pipe 19, which can be connected to a heat exchanged 20 before the liquid leaves the pressurized reaction system through regulating valve 21, which is activated by a pressure controlled regulator 22.

Heating of the system is brought about by steam through pipe 23, which after a check valve 24 is added to the circulating liquid through a separate "sparger" 25.

FIG. 1 shows two circuits for liquid attached to the reaction tank. The method can also apply only one or more circuits.

Figure 2:
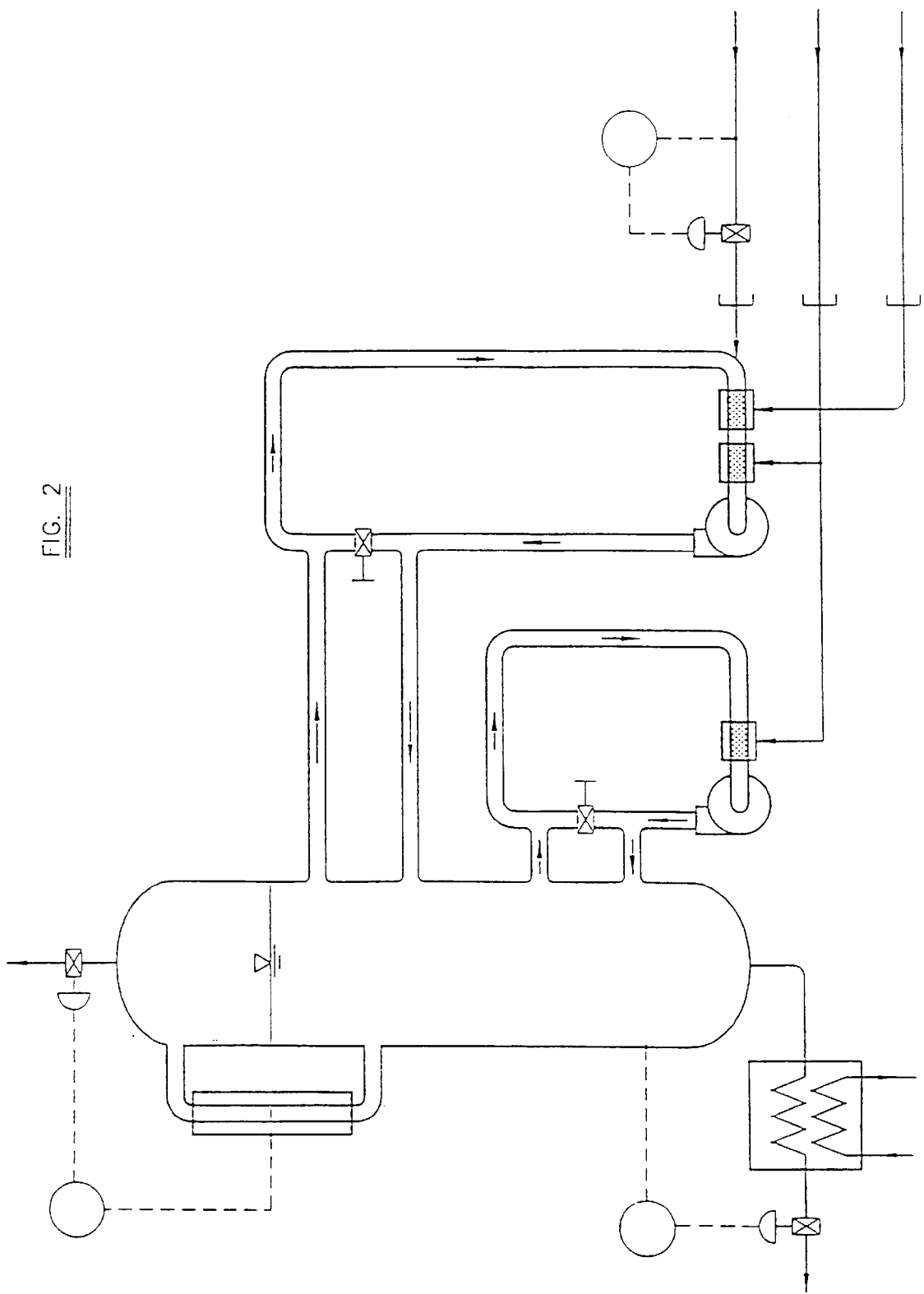
FIG. 2 depicts another embodiment with the reaction tank in a standing position.

Likewise, the reaction tank can be mounted in a lying position, as shown in FIG. 1, possibly with partition walls 14 as shown, or also in a standing position, as shown in FIG. 2, for the rest containing the same system elements as shown in FIG. 1.

For COD-reduction by enzymes the same method is applied, with the difference that the enzymes are conducted in through the pipe 7, without air by anaerobic process, and with air by aerobic process.

The apparatus of the invention functions as follows:

Within circuit 5 the special pump 9 brings about both circulation pumping and inner liquid turbulence. This creates a good accessibility between the components in the liquid to be oxidized and the oxygen or the enzymes which are added. The reaction speed increases and the reaction time is correspondingly reduced.

On its way through the reaction system towards the outlet of the system the liquid is on an average circulated several times within one and the same circuit under continuous influence of oxygen or enzymes.

The liquid has to move through one or more circuits, which all are liquid-wise communicating with the reaction tank.

The COD reduction in the liquid will bring about gas accumulations in the upper part of the reaction tank from where the gases are let out continuously through valve 17.

Concurrently, finished, oxidized liquid is let out of the system continuously from the bottom of the reaction tank through valve 21.

Actual liquid velocities within the respective circuits are in the order of 3–30 m/sec.

For the "spargers" 6 and 25 a material is chosen with orifice diameters preferably in the range of 0,5–25 microns.

The choice of the temperature in the reaction system is dependent upon the compounds to be oxidized, however, as a rule, temperatures below 150° C. are not applied by wet oxidation by oxygen or air.

By aerobic or anaerobic biological COD reduction with activated sludge lower temperatures are applied, respectively ca. 30° and ca. 60° C. As example may be mentioned that easily dissolved sugar compounds in the process liquid from the pulp and paper industry are oxidized by 150° C. and upwards, and the system pressure must be so set that the liquid does not start boiling within the plant.

The steam pressure for water at this temperature is approximately 4,8 bars. With a required safety margin of 25% the system's pressure in this case must be set at minimum 6–7 bars.

The not easily dissolved sugar compounds and also dissolved lignin require higher temperatures and corresponding pressures. By 200° C. is f.ex. the saturated steam pressure 16 bars, and a corresponding system pressure will therefore be minimum in the order of 20 bars, which however is a pressure considerably lower than the pressures applied today (200–300 bars).

In order to be economically optimized, the described apparatus should be applied for liquids with a COD-content in the range of 20 to 50 grams per liter liquid.

A wet oxidation of process liquid from the pulp and paper industry with a COD content in the order of 40 grams per liter will, be complete oxidation, release an internal heat content in the order of 120–150 kcal per liter, corresponding in principle to a temperature increase within the liquid to 120°–150° C. Within a system equipped with heat exchanging such heat development does not only make the reaction self sufficient with heat, but will also be capable of delivering usable heating energy, especially if the in-going liquid's temperature is high and the oxygen is added as compressed air, directly from compressor without preceding cooling, thus containing all compression heat which in whole is added to the oxidation process.

The heated gas mixture which is let out of the reaction tank can deliver its heat to external, heating purposes, f.ex. as added "burnt gases" in a boiler house, as a heated gas mixture, containing $CO_2$, nitrogen and excess air, or, by biological, anaerobe COD reduction with enzymes and activated sludge, also combustible methane gas. The main part of the heat excess can however be delivered in the heat exchanger 20, as hot water or steam.

I claim:

1. An apparatus for wet oxidation of COD-containing industrial and municipal effluents and COD-reduction by enzymes in aerobic and anaerobic plants within a closed and pressurized reaction apparatus, operating with oxygen, and/or air and evolved gases flowing continuously through the apparatus, the apparatus comprising one or more circuits (5), each consisting of a pumping device (9), a circulation pipe in which are situated a regulation valve (10) and devices for oxygen and/or enzymes inlet (6) and another inlet (25) for steam, which communicate liquid-wise with a separate reaction tank (11) through an outlet pipe (12) from the circuit and an inlet pipe (13) into the circuit, and each circuit having an inlet pipe (1) for continuous afflux of liquid to be treated, and an outlet pipe (12) for continuous discharge, the latter leading into the reaction tank (11), which has a separate outlet (19) for continuous discharge of liquid and a separate outlet (18) for continuous discharge of gases.

2. An apparatus as claimed in claim 1, further comprising a regulation valve (10) in the circuit (5) situated between the outlet (12) of the circuit and the inlet (13) to the circuit from the reaction tank.

3. An apparatus as claimed in claim 1 further comprising a reaction tank (11) equipped with partition walls (14), acting as separating overflows between the one or more circuits.

4. An apparatus as claimed in claim 1 comprising instrumentation (3) (16) (22), securing a controlled quantity of inflow of liquid into the apparatus (3), controlled outlet of evolved gases, related to a constant liquid level in the reaction tank (16), and a controlled outlet of liquid from the apparatus, related to the internal pressure of the apparatus (22).

5. An apparatus as claimed in claim 1 comprising a heat exchanger (20) installed in the liquid outlet pipe (19) from the reaction tank (11) before the liquid leaves the apparatus through the outlet valve (21).

* * * * *